United States Patent
Sanada et al.

(10) Patent No.: US 6,862,442 B2
(45) Date of Patent: Mar. 1, 2005

(54) RECEIVER

(75) Inventors: Yukitoshi Sanada, Tokyo (JP);
Masayoshi Abe, Tokyo (JP); Ryuji Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 594 days.

(21) Appl. No.: 10/039,846

(22) Filed: Oct. 23, 2001

(65) Prior Publication Data

US 2003/0054790 A1 Mar. 20, 2003

(51) Int. Cl.[7] .......................... H04B 1/26; H04B 15/00; H04B 1/16
(52) U.S. Cl. ...................... 455/334; 455/313; 455/324
(58) Field of Search .................................. 455/101, 225, 455/276.1, 303–304, 313–315, 323–325, 334, 337, 562.1

(56) References Cited

U.S. PATENT DOCUMENTS

| | | | |
|---|---|---|---|
| 5,585,803 A | * | 12/1996 | Miura et al. ................. 342/372 |
| 6,023,615 A | * | 2/2000 | Bruckert et al. .......... 348/14.08 |
| 6,058,318 A | * | 5/2000 | Kobayakawa et al. ... 455/562.1 |
| 6,535,721 B1 | * | 3/2003 | Burke et al. ................. 455/137 |
| 6,546,236 B1 | * | 4/2003 | Canada et al. ............... 455/304 |

FOREIGN PATENT DOCUMENTS

EP      0 805 561 A2 *  11/1997  ............ H04B/1/30

* cited by examiner

*Primary Examiner*—Simon Nguyen
(74) *Attorney, Agent, or Firm*—Frommer Lawrence & Haug LLP; William S. Frommer

(57) ABSTRACT

A receiver includes a phased array antenna and a demodulator. The phased array antenna includes first and second antenna elements and a phase shifter for shifting the phase of a signal received by the first antenna element by a predetermined amount. The demodulator includes a first junction circuit which receives a local signal and a signal output from the phase shifter and which generates a plurality of signals having a phase difference; a second junction circuit which receives a local signal and a signal output from the second antenna element and which generates a plurality of signals having a phase difference; signal combiners for combining corresponding signals output from the two junction circuits; power detectors for detecting the signal levels of the output signals of the signal combiners; and a converter for converting the outputs signals of the power detectors so as to obtain IQ signals.

26 Claims, 8 Drawing Sheets

RECEIVER

BACKGROUND OF THE INVENTION

1. Field of the Invention

The present invention relates to a receiver including a two-element phased array antenna and having a capability of performing demodulation by means of multiport direct conversion.

2. Description of the Related Art

In a conventional receiver including a two-element phased array antenna, RF signals received by the two-element antenna are directly combined at the RF frequency, and demodulation is performed on the resultant combined signal.

The demodulation is performed by means of, for example, direct conversion using a mixer and a local signal.

However, the conventional receiver has the problem that because the RF signals received by the two antenna elements are directly combined at the RF frequency, information about the amplitude of each RF signal is lost. This makes it difficult for a beam former to control the directivity.

When demodulation is performed using a mixer, it is difficult to obtain a wide bandwidth and it is required to apply a high-level local signal to the mixer. The application of the high local power causes the mixer to operate in a nonlinear fashion. As a result, low-distortion demodulation becomes difficult.

SUMMARY OF THE INVENTION

In view of the above, it is an object of the present invention to provide a receiver capable of detecting the amplitudes of signals received by antenna elements, easily controlling the directivity, and performing wide-band and low-distortion demodulation.

According to an aspect of the present invention, to achieve the above object, there is provided a receiver comprising a phased array antenna comprising first and second antenna elements for receiving a radio signal; and a phase shifter for shifting, by a predetermined amount, the phase of a signal received by the first antenna element; a local signal generator for generating a local signal with a predetermined frequency; and a direct conversion demodulator comprising first generating means which is supplied with the received signal output from the phase shifter of the phased array antenna and the local signal generated by the local signal generator and which generates two signals different in phase on the basis of at least one of the supplied signals and outputs at least one of the generated signals; second generating means which is supplied with the received signal output from the second antenna element of the phased array antenna and the local signal generated by the local signal generator and which generates two signals different in phase on the basis of at least one of the supplied signals and outputs at least one of the generated signals; at least one signal combiner for combining corresponding signals output from the first generating means and the second generating means; at least one power detector for detecting the signal level of a signal output from the signal combiner; and a converter for converting the signal output from the power detector on the basis of a predetermined parameter so as to obtain a plurality of signal components contained in the received signal or the local signal.

In this receiver, preferably, each of the first and second generating means includes a plurality of signal output terminals, and signals output from the first and second generating means are applied to the signal combiners such that the signals output from the output terminals which are similar in structure are applied to the same one of the signal combiners.

Preferably, the phased array antenna comprises first and second amplifiers for amplifying the signals received by the first and second antenna elements by predetermined amplification factors.

Preferably, the local signal generator sets the level of the local signal in accordance with the output signal of the converter.

Preferably, the receiver further comprises a regenerator for regenerating a carrier signal in accordance with the conversion signal output from the converter such that the carrier signal has the same frequency as that output from the local signal generator.

According to another aspect of the present invention, there is provided a receiver comprising a phased array antenna comprising first and second antenna elements for receiving a radio signal; first and second amplifiers for amplifying signals received by the first and second antenna elements, respectively, by predetermined amplification factors; and a phase shifter for shifting, by a predetermined amount, the phase of the signal received by the first antenna element; a local signal generator for generating a local signal with a predetermined frequency; and a direct conversion demodulator comprising first generating means which is supplied with the received signal shifted in phase by the phase shifter of the phased array antenna and the local signal generated by the local signal generator during a signal demodulation process and which is supplied, at a predetermined time not during the signal demodulation process, with the received signal shifted in phase by the phase shifter of the phased array antenna, thereby generating a plurality of signals which are different in phase; second generating means which is supplied with the received signal output from the second amplifier of the phased array antenna and which generates a plurality of signals different in phase; a first power detector for detecting the level of a signal output from the first generating means; a second power detector for detecting the level of a signal output from the second generating means; at least one signal combiner for combining corresponding signals output from the first generating means and the second generating means, except for output signals applied to the first and second power detectors; at least one third power detector for detecting the signal level of a signal output from the signal combiner; and a converter for, during the signal demodulation process, converting the output signals of the first, second, and third power detectors so as to obtain a plurality of signal components contained in the received signal or the local signal in accordance with a predetermined parameter, and, at a predetermined time not during the signal demodulation process, determining the amplification factors of the first and second amplifiers in accordance with the output signals of the first and second power detectors so that a predetermined condition is satisfied.

In this receiver, preferably, the converter determines the amplification factor such that $P_0=P_1$ where $P_0$ is the output signal power of the first power detector and $P_1$ is the output signal power of the second power detector.

Preferably, the receiver further comprises a controller for controlling the first and second amplifiers such that the first and second amplifiers have a gain equal to that determined by the converter.

According to still another aspect of the present invention, there is provided a receiver comprising a phased array antenna comprising first and second antenna elements for receiving a radio signal; first and second amplifiers for amplifying signals received by the first and second antenna elements, respectively, by predetermined amplification factors; and a phase shifter for shifting, by a predetermined amount, the phase of the signal received by the first antenna element; a local signal generator for generating a local signal with a predetermined frequency; and a direct conversion demodulator comprising first generating means which is supplied with the received signal shifted in phase by the phase shifter of the phased array antenna and the local signal generated by the local signal generator during a signal demodulation process and which is supplied, at a predetermined time not during the signal demodulation process, with the received signal shifted in phase by the phase shifter of the phased array antenna, thereby generating a plurality of signals which are different in phase; second generating means which is supplied with the received signal output from the second amplifier of the phased array antenna and which generates a plurality of signals different in phase; a first power detector for detecting the level of a signal output from the first generating means; a second power detector for detecting the level of a signal output from the second generating means; at least one signal combiner for combining corresponding signals output from the first generating means and the second generating means, except for output signals applied to the first and second power detectors; at least one third power detector for detecting the signal level of a signal output from the signal combiner; and a converter for, during the signal demodulation process, converting the output signals of the first, second, and third power detectors so as to obtain a plurality of signal components contained in the received signal or the local signal in accordance with a predetermined parameter, and, at a predetermined time not during the signal demodulation process, determining the amount of phase shift created by the phase shifter in accordance with the output signals of the first, second and third power detectors so that a predetermined condition is satisfied.

In this receiver, preferably, on the basis of the output signal powers $P_0$, $P_1$, and $P_2$ of the first, second and third power detectors, respectively, the converter determines the phase difference at the input terminals of the signal combiner between the signals received by the two antenna elements and determines the amount of phase shift created by the phase shifter so that the phase difference is cancelled.

Preferably, the receiver further comprises a controller for adjusting the phase shift of the phase shifter in accordance with the amount of phase shift determined by the converter.

According to still another aspect of the present invention, there is provided a receiver comprising a phased array antenna comprising first and second antenna elements for receiving a radio signal; first and second amplifiers for amplifying signals received by the first and second antenna elements, respectively, by predetermined amplification factors; and a phase shifter for shifting, by a predetermined amount, the phase of the signal received by the first antenna element; a local signal generator for generating a local signal with a predetermined frequency; and a direct conversion demodulator comprising first generating means which is supplied with the received signal shifted in phase by the phase shifter of the phased array antenna and the local signal generated by the local signal generator during a signal demodulation process and which is supplied, at a predetermined time not during the signal demodulation process, with the received signal shifted in phase by the phase shifter of the phased array antenna, thereby generating a plurality of signals which are different in phase; second generating means which is supplied with the received signal output from the second amplifier of the phased array antenna and which generates a plurality of signals different in phase; a first power detector for detecting the level of a signal output from the first generating means; a second power detector for detecting the level of a signal output from the second generating means; at least one signal combiner for combining corresponding signals output from the first generating means and the second generating means, except for output signals applied to the first and second power detectors; at least one third power detector for detecting the signal level of a signal output from the signal combiner; and a converter for, during the signal demodulation process, converting the output signals of the first, second, and third power detectors so as to obtain a plurality of signal components contained in the received signal or the local signal in accordance with a predetermined parameter, and, at a predetermined time not during the signal demodulation process, determining the amplification factors of the first and second amplifiers in accordance with the output signals of the first and second power detectors so that a predetermined condition is satisfied and also determining the amount of phase shift created by the phase shifter in according with the output signals of the first, second and third power detectors so that a predetermined condition is satisfied.

In this receiver, preferably, the converter determines the amplification factors so that the output signal power $P_0$ of the first power detector and the output signal power $P_1$ of the second power detector becomes equal to each other, and furthermore, on the basis of the output signal powers $P_0$, $P_1$, and $P_2$ of the first, second and third power detectors, respectively, the converter determines the phase difference at the input terminals of the signal combiner between the signals received by the two antenna elements and determines the amount of phase shift created by the phase shifter so that the phase difference is cancelled.

Preferably, the receiver further comprises a controller for controlling the first and second amplifiers so that the first and second amplifiers have the amplification factors determined by the converter, and for controlling the amount of phase shift created by the phase shifter so that the amount of phase shift determined by the converter is created by the phase shifter.

Preferably, signals output from the first and second generating means are applied to the signal combiners such that the signals output from the output terminals which are similar in structure are applied to the same one of the signal combiners.

Preferably, the local signal generator sets the level of the local signal in accordance with the output signal of the converter.

Preferably, the receiver further comprises a regenerator for regenerating a carrier signal in accordance with the conversion signal output from the converter such that the carrier signal has the same frequency as that output from the local signal generator.

Thus, in the present invention, the received signal output from the first antenna element and the local signal are applied to the first generating means, and the received signal output from the second antenna element and the local signal are applied to the second generating means, whereby multiport direct conversion is performed thereby demodulating the signal.

This receiver, which includes the two-element phased array antenna and which performs demodulation by means of multiport direct conversion, can arbitrarily control the directivity of the phased array antenna and can detect the amplitudes of the signals detected by the antenna elements.

Use of the multiport demodulator including the power detectors makes it possible for the receiver to have a wider bandwidth. This is useful in particular when a software radio communication technique is employed because this technique needs a multilane capability or a wide-band characteristic. Furthermore, it becomes possible to operate at higher frequencies. Because the power detectors operate in linear regions, low-distortion demodulation can be achieved using a low-power local signal.

In the present invention, when demodulation is performed, the received signal output from the first antenna element and the local signal are applied to the first generating means, and the received signal output from the second antenna element is applied to the second generating means, whereby the demodulation process is performed.

On the other hand, at a predetermined time not during the demodulation process, only the signals received by the two antenna elements are applied to the first and second generating means.

In this situation, the converter determines the amplification factors of the amplifiers in accordance with the output signals of the first and second power detectors so that a predetermined condition is satisfied. More specifically, for example, the amplification factors are determined so that $P_0=P_1$ where $P_0$ is the output signal power of the first power detector and $P_1$ is the output signal power of the second power detector.

Furthermore, on the basis of the output signal powers $P_0$, $P_1$, and $P_2$ of the first, second and third power detectors, respectively, the converter determines the phase difference at the input terminals of the signal combiner between the signals received by the two antenna elements and determines the amount of phase shift created by the phase shifter so that the phase difference is cancelled.

The controller controls the first and second amplifiers so that the first and second amplifiers have the amplification factors determined by the converter, and for controlling the amount of phase shift created by the phase shifter so that the amount of phase shift determined by the converter is created by the phase shifter.

Because the amount of phase shift and the amplitude amplification factors necessary to control the directivity of the phased array antenna are calculated directly from the received signal, it is not required to perform calibration for each antenna element, and thus it is possible to reduce the cost of the receiver. Furthermore, it is possible to minimize the change in characteristic of the receiver due to changes in characteristics of the antenna elements caused by a temperature change or an aging effect.

DESCRIPTION OF THE PREFERRED EMBODIMENTS

First Embodiment

Figure 1:
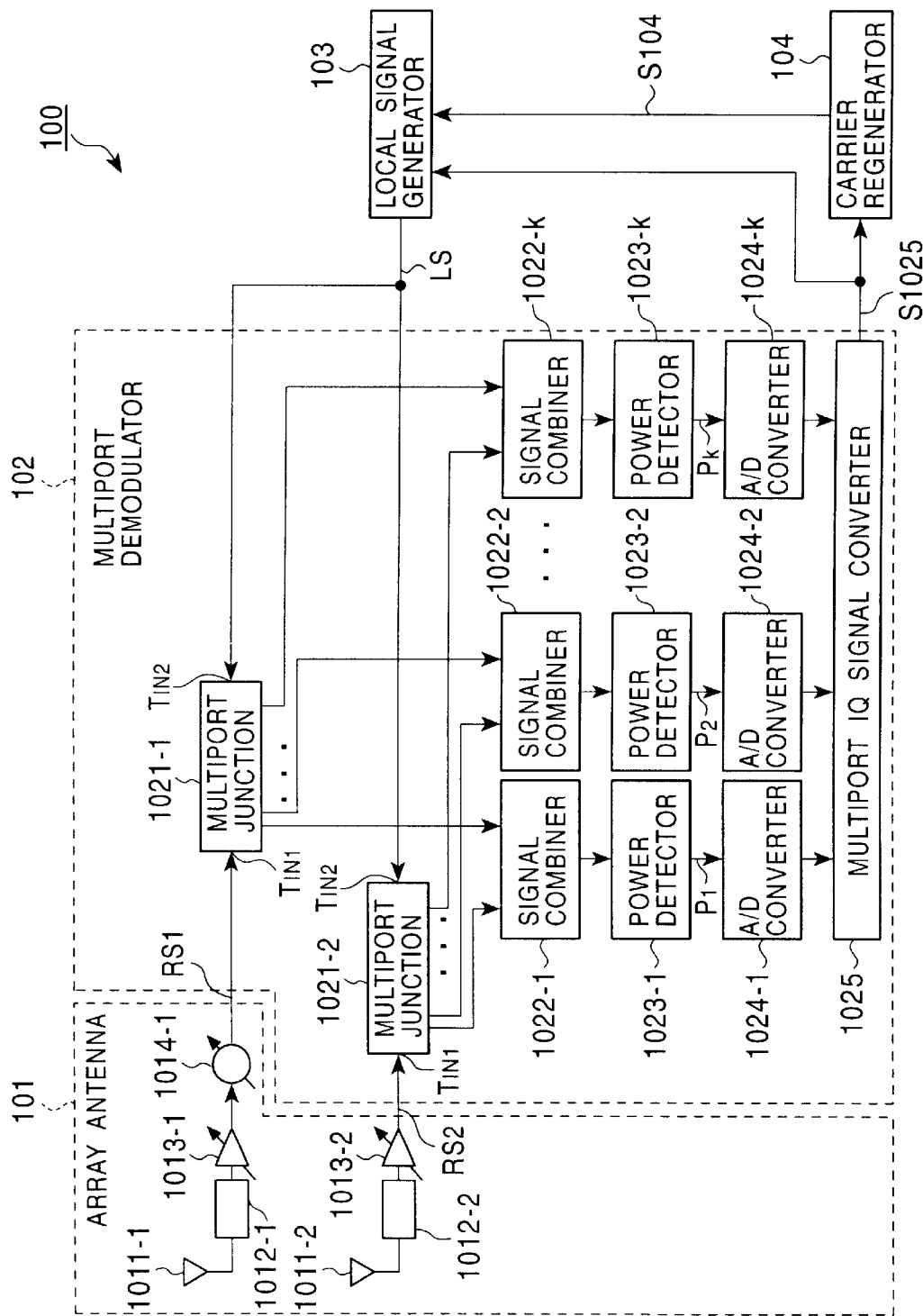
FIG. 1 is a block diagram illustrating the construction of a receiver which includes a two-element phased array antenna and which performs demodulation by means of multiport direct conversion, according to a first embodiment of the present invention.

FIG. 1 illustrates the construction of a receiver which includes a two-element phased array antenna and which performs demodulation by means of multiport direct conversion, according to a first embodiment of the present invention.

As shown in FIG. 1, the receiver 100 includes a phased array antenna 101, a multiport direct conversion demodulator 102, a local signal generator 103, and a carrier regenerator 104.

Herein, the demodulation based on the multiport direct conversion generically refers to demodulation performed using power detectors. The details of the demodulation technique based on the multiport direct conversion may be found, for example, in the following literatures.

(1) Ji Li, R. G. Bosisio, "A Six-port Direct Digital Millimeter Wave Receiver", MTT-S, 1994;

(2) Hans-Otto Scheck, et. al, "A method for implementing a direct conversion receiver with a six-port junction", EP 0 805 561 A2;

(3) V. Brankovic, EP 0 896 455 A1;

(4) V. Brankovic, et. al. WO 99/33166; and (5) G. Oberschmidt, et. al, "Calibration of a N-port receiver", European patent application No. 99113262.2, filed on Jul. 8, 1999.

The phased array antenna 101 includes two antenna elements 1011-1 and 1011-2, two preselect filters 1012-1 and 1012-2, two RF amplifiers 1013-1 and 1013-2, and one phase shifter 1014-1.

In the phased array antenna 101, the preselect filter 1012-1, the RF amplifier 1013-1, and the phase shifter 1014-1 are connected in cascade with the antenna element 1011-1, and the preselect filter 1012-2 and the RF amplifier 1013-2 are connected in cascade with the antenna element 1011-2. Furthermore, the output of the phase shifter 1014-1 and the output of the RF amplifier 1013-2 are connected to the multiport direct conversion demodulator 102 such that a signal out from the phase shifter 1014-1 and a signal output from the RF amplifier 1013-2 are supplied to the multiport direct conversion demodulator 102.

The phase shifter 1014-1 servers to shift the phase of a signal received by the antenna element 1011-1 by a predetermined amount so as to make the phased array antenna have directivity.

In the phased array antenna 101, the signal received by the antenna element 1011-1 is supplied to the multiport direct conversion demodulator 102 after being passed through the preselect filter 1012-1, the RF amplifier 1013-1, and the phase shifter 1014-1, which are connected in cascade to the antenna element 1011-1. The signal received by the antenna element 1011-2 is supplied to the multiport direct conversion demodulator 102 after being passed through the preselect filter 1012-2 and the RF amplifier 1013-2 which are connected in cascade to the antenna element 1011-2.

The multiport direct conversion demodulator 102 includes two multiport junction circuits (n-port junction circuits where n is an integer equal to or greater than 3) 1021-1 and 1021-2, signal combiners 1022-1 to 1022-$k$ ($k=n-2$), one or more power detectors (PDs) 1023-1 to 1023-$k$, A/D converters 1024-1 to 1024-$k$, and a multiport IQ signal converter 1025.

The multiport junction circuit 1021-1 includes a first input terminal TIN1 to which a first received signal RS1 is supplied from the phase shifter 1014-1 of the array antenna 101, and also includes a second input terminal TIN2 to which a local signal LS is supplied. The multiport junction circuit 1021-1 is supplied with the first received signal RS1 and the local signal LS and generates two signals (high-frequency signals) having a phase difference on the basis of at least one of the supplied signals. The first received signal RS1, the local signal LS, and at least one of the generated signals are output from the multiport junction circuit 1021-1 to the signal combiners 1022-1 to 1022-$k$.

The multiport junction circuit 1021-2 includes a first input terminal TIN1 to which a second received signal RS2 is supplied from the RF amplifier 1013-2 of the array antenna 101, and also includes a second input terminal TIN2 to which the local signal LS is supplied. The multiport junction circuit 1021-2 is supplied with the second received signal RS2 and the local signal LS and generates two signals (high-frequency signals) having a phase difference on the basis of at least one of the supplied signals. The second received signal RS2, the local signal LS, and at least one of the generated signals are output from the multiport junction circuit 1021-2 to the signal combiners 1022-1 to 1022-$k$.

That is, each of the multiport junction circuits 1021-1 and 1021-2 has two input terminals and at least one output terminal, and thus each multiport junction circuit operates as a n-port (multiport) circuit wherein n is equal to the sum of number of input terminals and the output terminals.

The signals output from the respective two multiport junction circuits 1021-1 and 1021-2 are supplied to the signal combiners 1022-1 to 1022-$k$ such that the output signals output from similar output terminals are supplied to the same signal combiner.

Each of the signal combiners 1022-1 to 1022-$k$ combines signals received from the respective multiport junction circuits 1021-1 and 1021-2 and supplies the resultant combined signal to one of power detectors 1023-1 to 1023-$k$ corresponding to the respective output terminals.

The power detectors 1023-1 to 1023-$k$ detect the amplitude components of the signals output from the respective signal combiners 1022-1 to 1022-$k$ and supply resultant detected signals P1 to Pk to the A/D converters 1024-1 to 1024-$k$, respectively.

The A/D converters 1024-1 to 1024-$k$ convert the detected signals P1 to Pk output from the power detectors 1023-1 to 1023-$k$ from analog form into digital form and supply the resultant signals to the multiport IQ signal converter 1025.

Specific examples of configurations of the multiport (n-port, where n is an integer from 3 to 6) junction circuit 1021 are described below with reference to the drawings.

Figure 2:
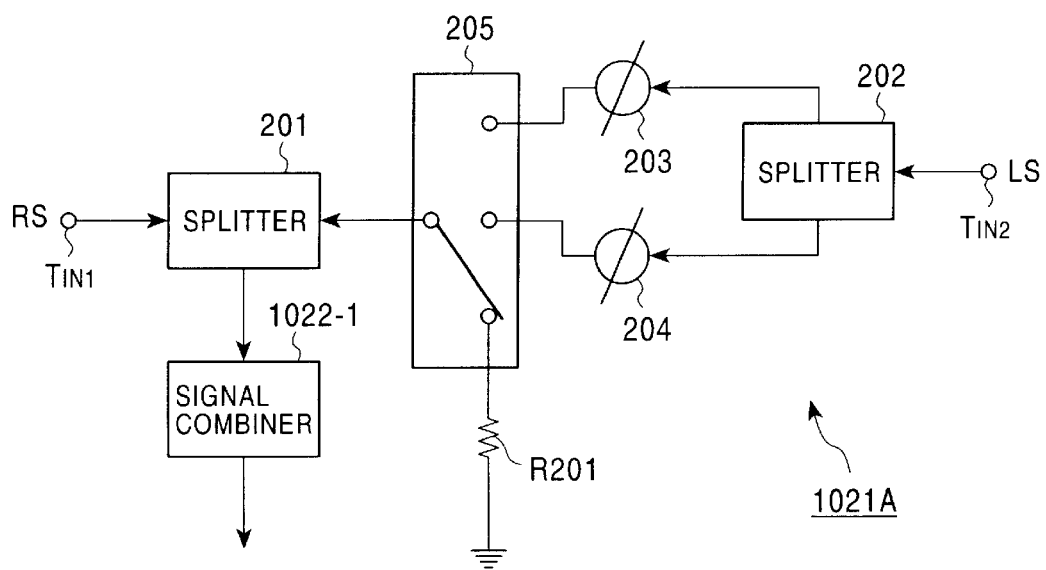
FIG. 2 is a circuit diagram illustrating an example of the circuit configuration of a 3-port junction circuit according to the present invention.

FIG. 2 is a circuit diagram illustrating an example of the circuit configuration of the 3-port junction circuit.

This 3-port junction circuit 1021A includes a first input terminal TIN1 to which a received signal is input, a second input terminal TIN2 to which a local signal is input, splitters 201 and 202, phase shifters 203 and 204, and switching circuit 205. The output side of this 3-port junction circuit 1021A is connected to one signal combiner 1022-1.

Herein, the term "3-port" is used because there are a total of three ports including two ports of the first and second input terminals TIN1 and TIN2 and the one port of the output terminal connected to the signal combiner 1022-1 of the splitter 201.

In the 3-port junction circuit 1021A shown in FIG. 2, the splitters 201 and 202, the phase shifters 203 and 204, and the switching circuit 205 form generating means.

In this 3-port junction circuit 1021A, the received signal RS input to the input terminal TIN1 is applied to the splitter 201 and split into two signals. One of the split signals is applied to the signal combiner 1022-1.

On the other hand, the local signal LS input to the input terminal TIN2 is applied to the splitter 202 and split into two signals. One of the split signals is applied to the phase shifter 203 and shifted in phase by $\theta$. The resultant phase-shifted signal is then applied to the switching circuit 205. The other split signal is applied to the phase shifter 204 and shifted in phase by $\theta$. The resultant phase-shifted signal is then applied to the switching circuit 205. After being shifted in phase by the phase shifters 203 and 204, the signals are alternately selected by the switching circuit 205 and output to the splitter 201.

The signal input to the splitter 201 is split into two signals one of which is applied to the signal combiner 1022-1 and the other one is applied to the input terminal TIN1.

Figure 3:
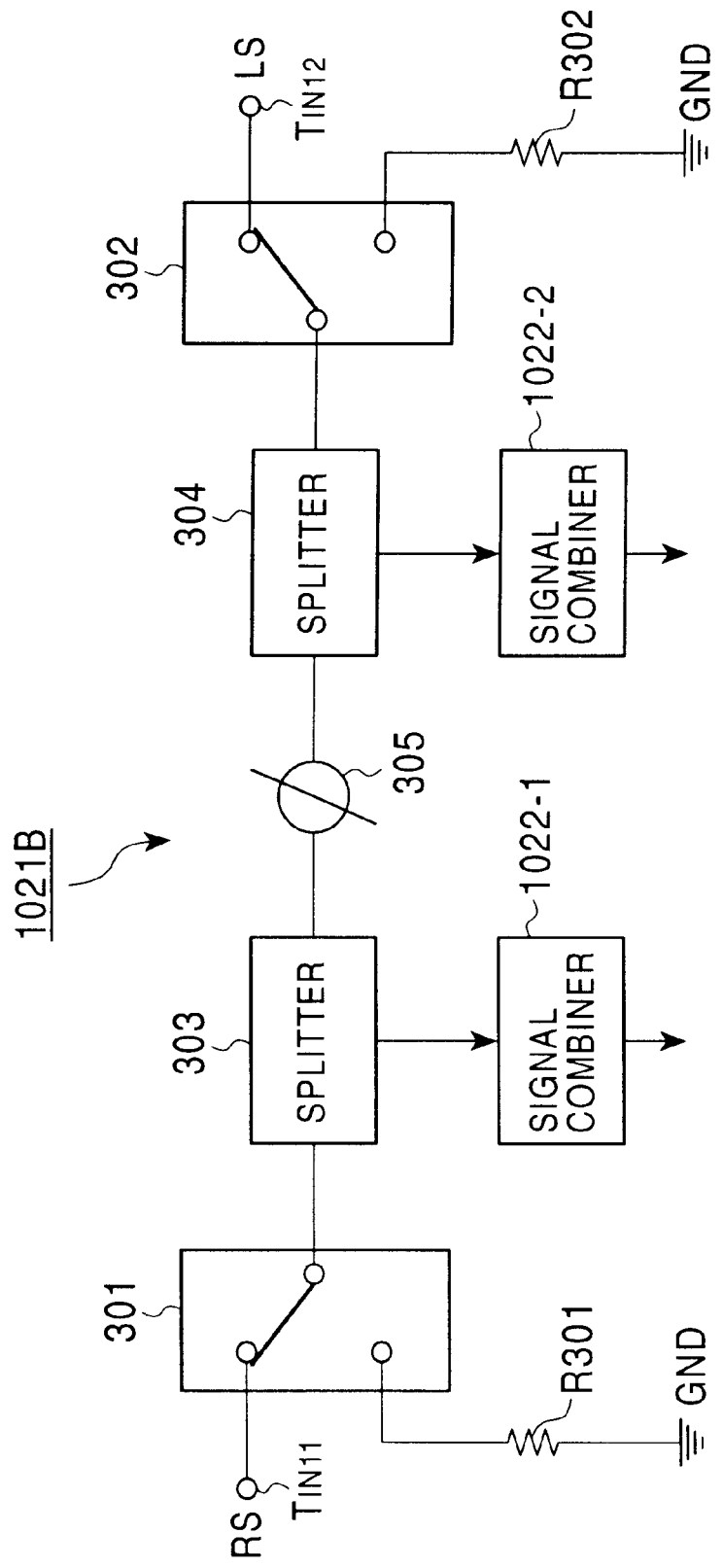
FIG. 3 is a circuit diagram illustrating an example of the circuit configuration of a 4-port junction circuit according to the present invention.

FIG. 3 is a circuit diagram illustrating an example of the circuit configuration of a 4-port junction circuit.

This 4-port junction circuit 1021B includes a first input terminal TIN1 to which a received signal is input, a second input terminal TIN2 to which a local signal is input, switching circuits 301 and 302, splitters 303 and 304, and a phase shifter 305. The output side of this 4-port junction circuit 1021B is connected to two signal combiners 1022-1 and 1022-2.

Herein, the term "4-port" is used because there are a total of four ports including two ports of the first and second input terminals TIN1 and TIN2 and two ports of the output terminals one of which is connected to the signal combiner 1022-1 of the splitter 303 and the other one is connected to the signal combiner 1022-2 of the splitter 304.

In the 4-port junction circuit 1021B shown in FIG. 3, the switching circuits 301 and 302, the splitters 303 and 304, and the phase shifter 305 form generating means.

In this 4-port junction circuit 1021B, the received signal RS input to the input terminal TIN1 is applied, via the high-speed switching circuit 301, to the splitter 303 and split into two signals. One of the split signals is applied to the signal combiner 1022-1, and the other is applied to the phase shifter 305.

The phase shifter 305 shifts the phase of the applied signal by an amount of $\theta$. The resultant phase-shifted signal is applied to the splitter 304 and split into two signals. One of the split signals output from the splitter 304 is applied to the signal combiner 1022-2, and the other is applied to the high-speed switching circuit 302.

On the other hand, the local signal LS input to the input terminal TIN2 is applied, via the high-speed switching circuit 302, to the splitter 304 and split into two signals. One of the split signals is applied to the signal combiner 1023-2, and the other is applied to the phase shifter 305.

The phase shifter 305 shifts the phase of the local signal applied from the splitter 304 by an amount of θ. The resultant phase-shifted signal is applied to the splitter 303 and split into two signals. One of the split signals output from the splitter 303 is applied to the signal combiner 1023-1, and the other is applied to the high-speed switching circuit 301.

Thus, the received signal and the local signal shifted in phase by θ are applied to the signal combiner 1022-1, while the received signal shifted in phase by θ and the local signal are applied to the signal combiner 1022-2.

Figure 4:
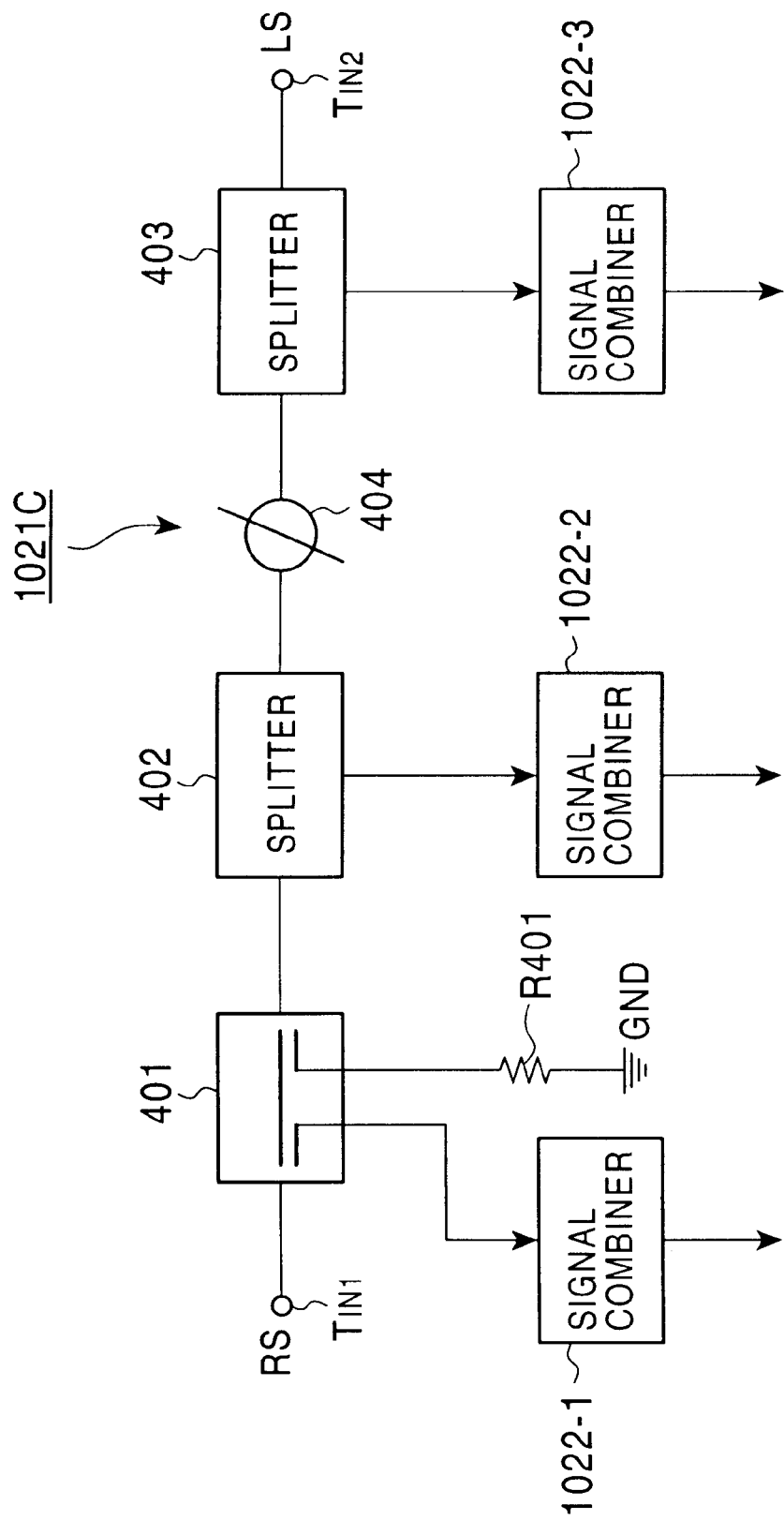
FIG. 4 is a circuit diagram illustrating an example of the circuit configuration of a 5-port junction circuit according to the present invention.

FIG. 4 is a circuit diagram illustrating an example of the circuit configuration of a 5-port junction circuit.

This 5-port junction circuit 1021C includes a first input terminal TIN1 to which a received signal is input, a second input terminal TIN2 to which a local signal is input, a coupler 401, splitters 402 and 403, and a phase shifter 404. The output side of this 5-port junction circuit 1021C is connected to three signal combiners 1022-1, 1022-2, and 1022-3.

Herein, the term "5-port" is used because there are a total of five ports including two ports of the first and second input terminals TIN1 and TIN2 and further three ports of the output terminals which are respectively connected to the signal combiner 1022-1 of the coupler 401, the signal combiner 1022-2 of the splitter 402, and the signal combiner 1022-3 of the splitter 403.

In this 5-port junction circuit 1021C, the coupler 401, the splitters 402 and 403, and the phase shifter 404 form generating means.

In this 5-port junction circuit 1021C, the received signal RS input to the input terminal TIN1 is applied to the splitter 402 via the coupler 401, and a part of the input signal is applied to the signal combiner 1022-1.

The received signal applied to the splitter 402 is split into two signals. One of the split signals is applied to the signal combiner 1022-2, and the other is applied to the phase shifter 404.

The phase shifter 404 shifts the phase of the received signal applied from the splitter 402 by an amount of θ. The resultant phase-shifted signal is applied to the splitter 403 and split into two signals. One of the split signals output from the splitter 403 is applied to the signal combiner 1022-3, and the other is applied to the input terminal TIN2.

On the other hand, the local signal LS input to the input terminal TIN2 is applied to the splitter 403 and split into two signals. One of the split signals is applied to the signal combiner 1022-3, and the other is applied to the phase shifter 404.

The phase shifter 404 shifts the phase of the local signal applied from the splitter 403 by an amount of θ. The resultant phase-shifted signal is applied to the splitter 402 and split into two signals. One of the split signals output from the splitter 402 is applied to the signal combiner 1022-2, and the other is applied to the coupler 401.

Thus, the received signal is applied to the signal combiner 1022-1; the received signal and the local signal shifted in phase by θ are applied to the signal combiner 1022-2; and the received signal shifted in phase by θ and the local signal are applied to the signal combiner 1023-3.

Figure 5:
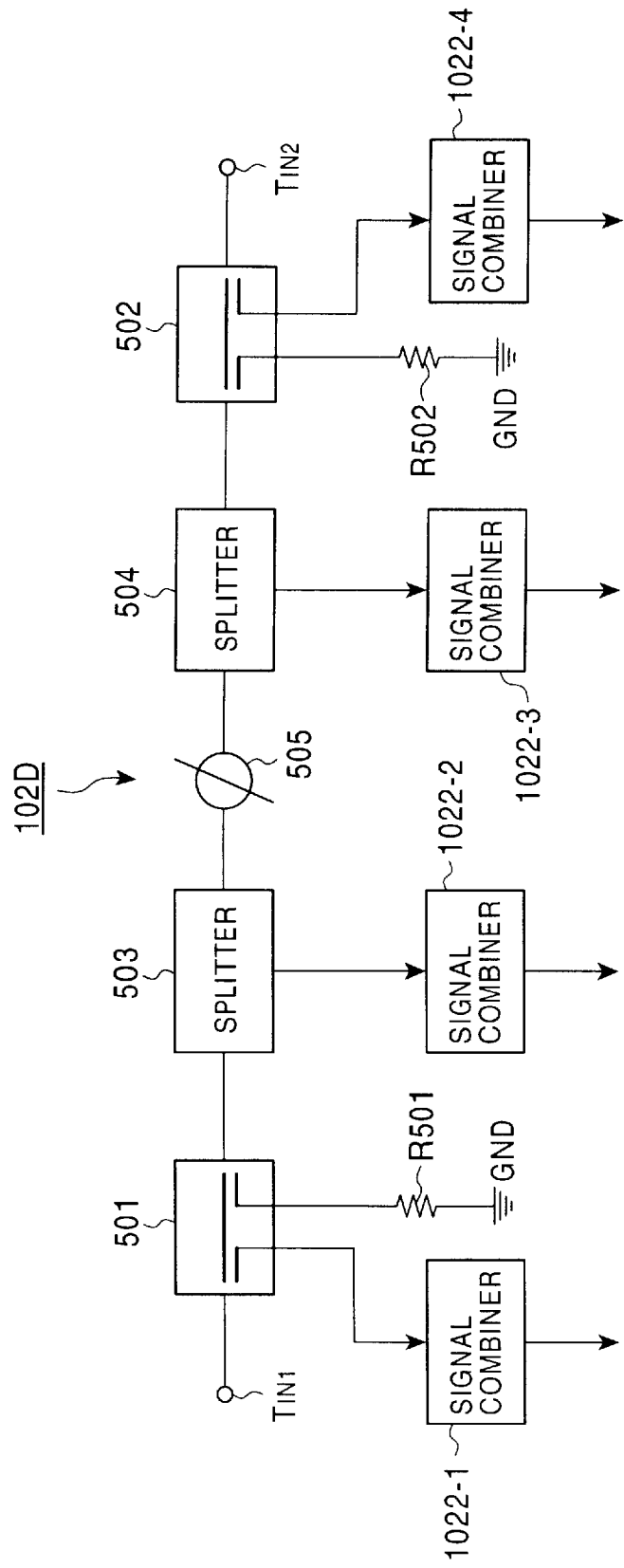
FIG. 5 is a circuit diagram illustrating an example of the circuit configuration of a 6-port junction circuit according to the present invention.

FIG. 5 is a circuit diagram illustrating an example of the circuit configuration of a 6-port junction circuit.

This 6-port junction circuit 1021D includes a first input terminal TIN1 to which a received signal is input, a second input terminal TIN2 to which a local signal is input, couplers 501 and 502, splitters 503 and 504, and a phase shifter 505. The output side of this 5-port junction circuit 1021D is connected to four signal combiners 1022-1, 1022-2, 1022-3, and 1022-4.

Herein, the term "6-port" is used because there are a total of six ports including two ports of the first and second input terminals TIN1 and TIN2 and further four ports of the output terminals which are respectively connected to the signal combiner 1022-1 of the coupler 501, the signal combiner 1022-2 of the splitter 503, the signal combiner 1022-3 of the splitter 504, and the signal combiner 1022-4 of the coupler 502.

In this 6-port junction circuit 1021D, the couplers 501 and 502, the splitters 503 and 504, and the phase shifter 505 form generating means.

In this 6-port junction circuit 1021D, the received signal RS input to the input terminal TIN1 is applied to the splitter 503 via the coupler 501, and a part of the input signal is applied to the signal combiner 1022-1.

The received signal applied to the splitter 503 is split into two signals. One of the split signals is applied to the signal combiner 1022-2, and the other is applied to the phase shifter 505.

The phase shifter 505 shifts the phase of the received signal applied from the splitter 503 by an amount of θ. The resultant phase-shifted signal is applied to the splitter 504 and split into two signals. One of the split signals output from the splitter 504 is applied to the signal combiner 1022-3, and the other is applied to the coupler 502.

The local signal LS is applied to the input terminal TIN2 of the coupler 502.

The local signal LS input to the input terminal TIN2 is applied to the splitter 504 via the coupler 502, and a part of the local signal LS is applied to the signal combiner 1022-4.

The local signal applied to the splitter 504 is split into two signals. One of the split signals is applied to the signal combiner 1022-3, and the other is applied to the phase shifter 505.

The phase shifter 505 shifts the phase of the local signal applied from the splitter 504 by an amount of θ. The resultant phase-shifted signal is applied to the splitter 503 and split into two signals. One of the split signals output from the splitter 503 is applied to the signal combiner 1022-2, and the other is applied to the coupler 501.

Thus, the received signal is applied to the signal combiner 1022-1; the received signal and the local signal shifted in phase by θ are applied to the signal combiner 1022-2; the received signal shifted in phase by θ and the local signal are applied to the signal combiner 1022-3; and the local signal is applied to the signal combiner 1022-4.

The multiport IQ signal converter 1025 converts the digital signals detected by the power detectors in accordance with predetermined circuit parameters including circuit parameters of the multiport junction circuits 1021-1 and 1021-2, so as to obtain a plurality of signal components contained in the original received signal or local signal, that is, the multiport IQ signal converter 1025 demodulates the digital signals detected by the power detectors into an in-phase signal (I) and a quadrature signal (Q).

The detected signals $P_1$ to $P_k$ output from the power detectors 1023-1 to 1023-$k$ are converted by the multiport IQ signal converter 1025 into demodulated signals, that is, the in-phase signal I(t) and the quadrature signal Q(t) in accordance with the following equation (1).

$$I(t) = f_I(P_1, P_2, \ldots, P_N)$$
$$Q(t) = f_q(P_1, P_2, \ldots, P_N) \quad (1)$$

The local signal generator 103 generates the local signal LS with the predetermined frequency and supplies it to the multiport junctions circuits 1021-1 and 1021-2.

When the local signal generator 103 generates the local signal LS, the local signal generator 103 controls the signal level in accordance with an output signal S1025 output from the multiport IQ signal converter 1025 and controls the frequency thereof in accordance with a regenerated signal S104 output from the carrier regenerator 104.

The carrier regenerator 104 regenerates a carrier signal S104 in accordance with the demodulated signal output from the multiport IQ signal converter 1025 and supplies the resultant regenerated signal S104 to the local signal generator 103.

The multiport junction circuit having the configuration described above operates as follows.

The radio signal received by the antenna element 1011-1 of the phased array antenna 101 is supplied to the phase shifter 1014-1 after being passed through the preselect filter 1012-1 and the RF amplifier 1013-1 which are connected in cascade to the antennal element 1011-1. The phase shifter 1014-1 shifts the phase of the received signal by a predetermined amount and supplies the resultant signal to the multiport direct conversion demodulator 102.

On the other hand, the radio signal received by the antenna element 1011-2 is supplied to multiport direct conversion demodulator 102 after being passed through the preselect filter 1012-2 and the RF amplifier 1013-2 which are connected in cascade to the antenna element 1011-2.

The multiport junction circuit 1021-1 generates at least two signals having a phase difference on the basis of the first received signal RS1 output from the phase shifter 1014-1 of the array antenna 101 and the local signal LS generated by the local signal generator 103. The resultant two signals are supplied to the signal combiners 1022-1 to 1022-k.

The multiport junction circuit 1021-2 generates at least two signals having a phase difference on the basis of the second received signal RS2 output from the RF amplifier 1013-2 of the array antenna 101 and the local signal LS generated by the local signal generator 103. The resultant two signals are supplied to the signal combiners 1022-1 to 1022-k.

Each of the signal combiners 1022-1 to 1022-k combines signals received from the respective multiport junction circuits 1021-1 and 1021-2 and supplies the resultant combined signal to one of power detectors 1023-1 to 1023-k corresponding to the respective output terminals.

The power detectors 1023-1 to 1023-k detect the amplitude components of the output signals output from the signal combiners 1022-1 to 1022-k and supply the resultant signals P1 to Pk to corresponding A/D converters 1024-1 to 1024-k. The A/D converters 1024-1 to 1024-k convert the supplied signals from analog form into digital form and supply the resultant digital signals to the multiport IQ signal converter 1025.

The multiport IQ signal converter 1025 demodulates the supplied detected signals into signal components, that is, an in-phase signal I and a quadrature signal Q, contained in the original received signal, on the basis of the circuit parameters including the circuit parameters of the multiport junction circuits 1021-1 and 1021-2. The resultant demodulated signal S1025 is supplied to the local signal generator 103 and the carrier regenerator 104.

The carrier regenerator 104 regenerates a carrier signal with a frequency equal to that specified by the local signal generator 103.

As described above, the receiver according to the first embodiment of the present invention includes the phased array antenna 101 and the multiport direct conversion demodulator 102. The phased array antenna 101 includes the antenna elements 1011-1 and 1011-2, wherein the preselect filter 1012-1, the RF amplifier 1013-1, and the phase shifter 1014-1 for shifts the phase of the signal received by the antenna element 1011-1 by a particular amount so that the phased array antenna has directivity are connected in cascade to the antenna element 1011-1, and the preselect filter 1012-1 and the RF amplifier 1013-2 are connected in cascade to the antenna element 1011-2. The multiport direct conversion demodulator 102 includes the multiport junction circuit 1021-1 which is supplied with the local signal LS and the first received signal RS1 output from the phase shifter 1014-1 of the array antenna 101 and which generates two signals (high-frequency signals) having a phase difference on the basis of at least one of the supplied signals and outputs the first received signal RS1, the local signal LS, and at least one of the generated signals; the multiport junction circuit 1021-1 which is supplied with the local signal LS and the second received signal RS2 output from the RF amplifier 1013-2 of the array antenna 101 and which generates two signals (high-frequency signals) having a phase difference on the basis of at least one of the supplied signals and outputs the second received signal RS2, the local signal LS, and at least one of the generated signals; signal combiners 1022-1 to 1022-k for combining the signals output from the output terminals of the multiport junction circuits 1021-1 and 1021-2 and supplying the combined signals to the power detectors 1023-1 to 1023-k corresponding to the output terminals of the multiport junction circuits 1021-1 and 1021-2; the power detectors 1023-1 to 1023-k for detecting the amplitude components of the signals output from the signal combiners 1022-1 to 1022-k and outputting the resultant signals as P1 to Pk; the A/D converters 1024-1 to 1024-k for converting the detected signals P1 to Pk output from the power detectors 1023-1 to 1023-k from analog form into digital form; and the multiport IQ signal converter 1025 for converting the digital signals detected by the power detectors in accordance with predetermined circuit parameters including circuit parameters of the multiport junction circuits 1021-1 and 1021-2, so as to obtain a plurality of signal components contained in the original received signal or local signal, that is, for demodulating the digital signals detected by the power detectors into an in-phase signal (I) and a quadrature signal (Q). Thus, the receiver constructed in the above-described manner according to the first embodiment of the present invention has the advantage that information about the amplitudes of the signals received by the antenna elements is not lost and the directivity of the phased array antenna can be arbitrarily controlled.

Furthermore, use of the multiport demodulator including the power detectors makes it possible to expand the bandwidth of the receiver. This is useful in particular when a software radio communication technique is employed because this technique needs a multiband capability or a wide-band characteristic. In advanced radio communication techniques, there is a tendency to use a carrier at a higher frequency. The multiport demodulator can adapt to such a higher-frequency operation.

In the multiport demodulator, because the power detectors operate in linear regions, low-distortion demodulation can be achieved using a low-power local signal.

Second Embodiment

Figure 6:
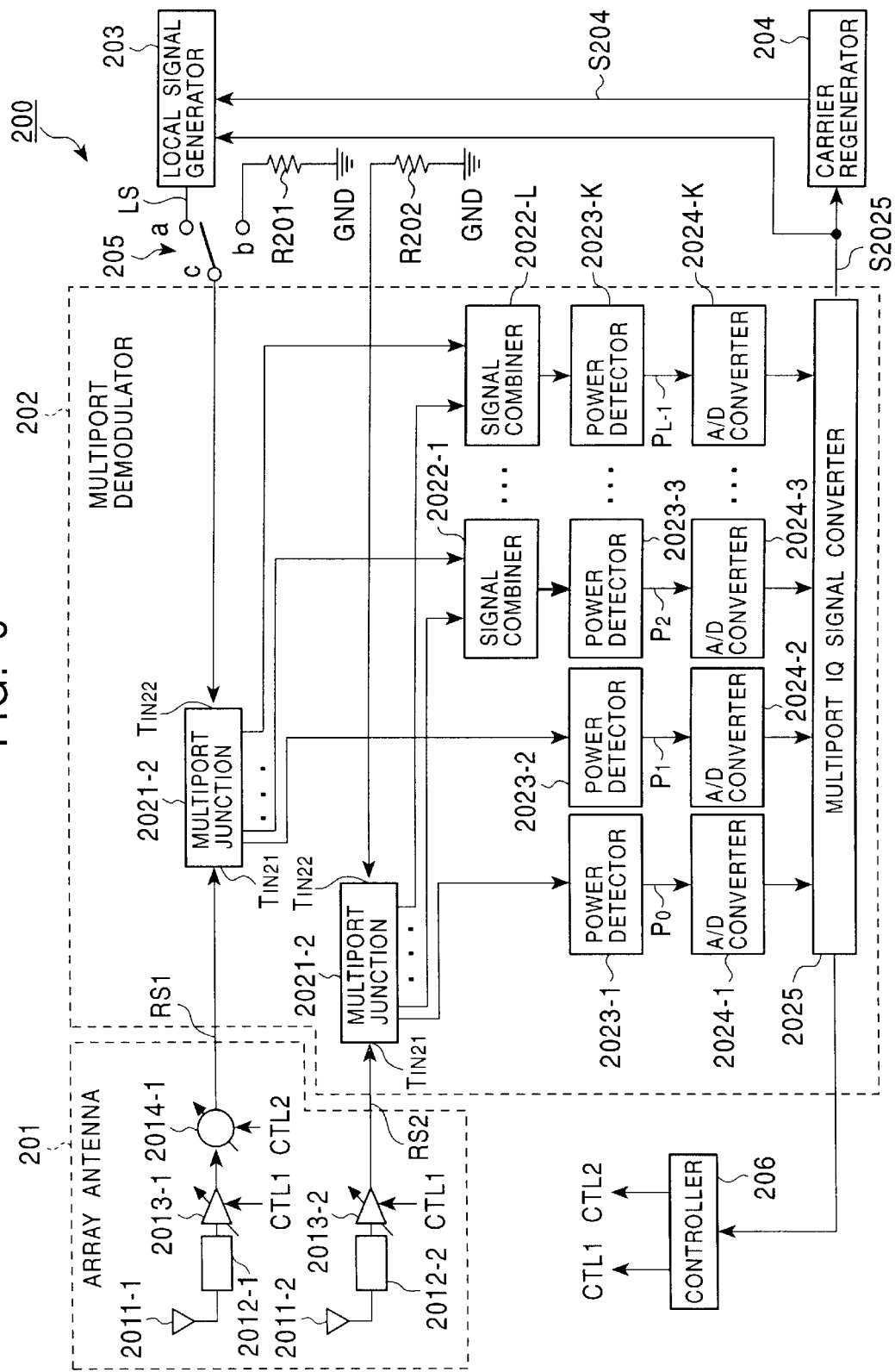
FIG. 6 is a block diagram illustrating the construction of a receiver which includes a two-element phased array antenna and which performs demodulation by means of multiport direct conversion, according to a second of the present invention.

FIG. 6 illustrates the construction of a receiver which includes a two-element phased array antenna and which performs demodulation by means of multiport direct conversion, according to a second embodiment of the present invention.

As shown in FIG. 6, the receiver 200 includes a phased array antenna 201, a multiport direct conversion demodulator 202, a local signal generator 203, a carrier regenerator 204, a switching circuit (SPDTRF switching circuit) 205, and a controller 206.

The phased array antenna 201 includes two antenna elements 2011-1 and 2011-2, two preselect filters 2012-1 and 2012-2, two RF amplifiers 2013-1 and 2013-2, and one phase shifter 2014-1.

In the phased array antenna 201, the preselect filter 2012-1, the RF amplifier 2013-1, and the phase shifter 2014-1 are connected in cascade with the antenna element 2011-1, and the preselect filter 2012-2 and the RF amplifier 2013-2 are connected in cascade with the antenna element 2011-2. Furthermore, the output of the phase shifter 2014-1 and the output of the RF amplifier 2013-2 are connected to the multiport direct conversion demodulator 202 such that a signal out from the phase shifter 2014-1 and a signal output from the RF amplifier 2013-2 are supplied to the multiport direct conversion demodulator 202.

The variable gain RF amplifier 2013-1 amplifies the signal received by the antenna element 2011-1 by an amplification factor (gain) corresponding to a control signal CTL1. The resultant amplified signal is supplied to the phase shifter 2014-1.

The variable gain RF amplifier 2013-2 amplifies the signal received by the antenna element 2011-2 by an amplification factor (gain) corresponding to the control signal CTL1. The resultant amplified signal is supplied to the multiport direct conversion demodulator 202.

The phase shifter 2014-1 shifts the phase of the signal received by the antenna element 2011-1 by an amount corresponding to a control signal CTL2 so as to make the phased array antenna have directivity.

In the phased array antenna 201, the signal received by the antenna element 2011-1 is supplied to the multiport direct conversion demodulator 202 after being passed through the preselect filter 2012-1, the variable gain RF amplifier 2013-1, and the phase shifter 2014-1, which are connected in cascade to the antenna element 2011-1. The signal received by the antenna element 2011-2 is supplied to the multiport direct conversion demodulator 202 after being passed through the preselect filter 2012-2 and the variable gain RF amplifier 2013-2 which are connected in cascade to the antenna element 2011-2.

The multiport direct conversion demodulator 202 includes two multiport junction circuits (N-port junction circuits where N is an integer equal to or greater than 4) 2021-1 and 2021-2, signal combiners 2022-1 to 2022-L (L=N−2), three or more power detectors (PDs) 2023-1 to 2023-K (K=N−1), A/D converters (ADCs) 2024-1 to 2024-K, and a multiport IQ signal converter 2025.

The multiport junction circuit 2021-1 includes a first input terminal TIN21 and a second input terminal TIN22, wherein a first received signal RS1 is applied to the first input terminal TIN21 from the phase shifter 2014-1 of the array antenna 201, and the second input terminal TIN22 is connected to a switching circuit 205 such that a local signal LS is supplied to the second input terminal TIN22 or the second input terminal TIN22 is grounded via a resistor R201, whereby the multiport junction circuit 2021-1 receives both the first received signal RS1 and the local signal LS or only the first received signal RS1, and the multiport junction circuit 2021-1 generates two signals having a phase difference. The generated signals, the first received signal RS1, the local signal LS are output from the multiport junction circuit 2021-1 to the power detector 2023-2 and the signal combiners 2022-1 to 2022-L.

The switching circuit 205 has a first terminal a connected to the output terminal of the local signal generator 203; a second terminal b connected to a ground potential GND via the resistor R201; and a third terminal c connected to the second input terminal TIN22 of the multiport junction circuit 2021-1. As will be described later, when demodulation is performed to obtain IQ signals, the third terminal c is connected to the first terminal a, whereas when the amplitude of the received signal and the amount of phase shift created by the phase shifter 2014-1 are determined, the third terminal c is connected to the second terminal b.

The multiport junction circuit 2021-2 has a first input terminal TIN21 and a second input terminal TIN22, wherein a second received signal RS2 is supplied to the first input terminal TIN21 from the RF amplifier 2013-2 of the array antenna 201, and the second input terminal TIN22 is grounded via a resistor R202. In response to receiving the second received signal RS1 and the ground voltage, the multiport junction circuit 2021-2 generates two signal having a phase difference. The generated signals are the second received signal RS2 are output from the multiport junction circuit 2021-2 to the power detector 2023-1 and the signal combiners 2022-1 to 2022-L.

That is, each of the multiport junction circuits 2021-1 and 2021-2 has two input terminals and at least one output terminal, and thus each multiport junction circuit operates as a n-port (multiport) circuit wherein n is equal to the sum of number of input terminals and the output terminals.

The signals output from the respective two multiport junction circuits 2021-1 and 2021-2 are supplied to the signal combiners 2022-1 to 2022-L such that the output signals output from similar output terminals are supplied to the same signal combiner. A first output terminal of the multiport junction circuit 2021-1 is connected to the input terminal of the power detector 2023-2, and a first output terminal of the multiport junction circuit 2021-2 is connected to the input terminal of the power detector 2023-1.

Each of the signal combiners 2022-1 to 2022-L combines signals received from the respective multiport junction circuits 2021-1 and 2021-2 and supplies the resultant combined signal to one of power detectors 2023-3 to 2023-K corresponding to the respective output terminals.

The power detector 2023-1 detects the amplitude component of the signal output from the multiport junction circuit 2021-2 and supplies a resultant detected signal P0 to the A/D converter 2024-1.

The power detector 2023-2 detects the amplitude component of the signal output from the multiport junction circuit 2021-1 and supplies a resultant detected signal P1 to the A/D converter 2024-2.

The power detectors 2023-3 to 2023-K (corresponding to a third power detector according to the present invention) detect the amplitude components of the signals output from the respective signal combiners 2022-1 to 2022-L and supply resultant detected signals P2 to PL-1 to the A/D converters 2024-3 to 2024-K, respectively.

The A/D converter 2024-1 converts the detected signal P0 output from the power detector 2023-1 from analog form into digital form and supplies the resultant digital signals to the multiport IQ signal converter 2025.

The A/D converter 2024-2 converts the detected signal P1 output from the power detector 2023-2 from analog form into digital form and supplies the resultant digital signal to the multiport IQ signal converter 2025.

The A/D converters 2024-3 to 2024-K convert the detected signals P2 to PL-1 output from the power detectors 2023-3 to 2023-K from analog form into digital form and supply the resultant digital signals to the multiport IQ signal converter 2025.

Specific examples of configurations of the multiport (N-port, N=4 to 6) junction circuit 2021 are described below.

One of the configurations described earlier with reference to FIG. 3, 4, or 5, according to the first embodiment, may be applied to the multiport (N-port) multiport junction circuit 2021.

Another example of the configuration of the 5-port junction circuit is described below with reference to FIG. 7.

Figure 7:
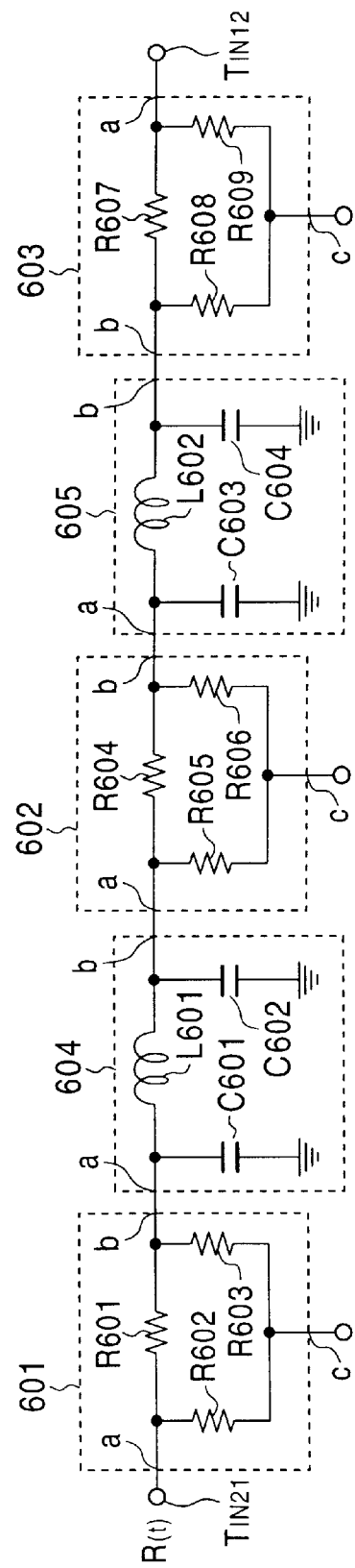
FIG. 7 is a circuit diagram illustrating another example of the circuit configuration of a 5-port junction circuit according to the present invention.

The circuit configuration of the 5-port junction circuit 2021A shown in FIG. 7 is similar to that shown in FIG. 4 except that the coupler is replaced with a splitter.

More specifically, the 5-port junction circuit 2021A includes, as shown in FIG. 7, a first signal input terminal TIN21 for inputting the received signal, a second signal input terminal TIN22 for inputting the local signal, a first splitter 601, a second splitter 602, a third splitter 603, a first phase shifter 604, and a second phase shifter 605.

The first splitter 601 includes a first terminal a, a second terminal b, and a third terminal c. The first terminal an is connected to the first signal input terminal TIN21 so that the received signal Sr applied to the first terminal an is split into two signals and output from the second terminal b and the third terminal c. On the other hand, a signal applied to the second terminal b is split into two signals and output from the first terminal an and the third terminal c. The third terminal c of the first splitter 601 is connected to the input terminal of the first power detector 606.

As shown in FIG. 7, the first splitter 601 has a circuit configuration formed of resistors R601 to R603. In this first splitter 601, the resistor R601 is connected between the first terminal an and the second terminal b, the resistor R602 is connected between the first terminal an and the third terminal c, and the resistor R603 is connected between the second terminal b and the third terminal c.

The second splitter 602 includes a first terminal a, a second terminal b, and a third terminal c. A signal applied to the first terminal an is split into two signals and output from the second terminal b and the third terminal c. On the other hand, a signal applied to the second terminal b is split into two signals and output from the first terminal an and the third terminal c. The third terminal c of the second splitter 602 is connected to the input terminal of the second power detector 607.

The second splitter 602 has a circuit configuration formed of resistors R604 to R606. In this second splitter 602, the resistor R604 is connected between the first terminal an and the second terminal b, the resistor R605 is connected between the first terminal an and the third terminal c, and the resistor R606 is connected between the second terminal b and the third terminal c.

The third splitter 603 includes a first terminal a, a second terminal b, and a third terminal c. The first terminal an is connected to the second signal input terminal TIN22 so that the local signal S0 applied to the first terminal an is split into two signals and output from the second terminal b and the third terminal c. On the other hand, a signal applied to the second terminal b is split into two signals and output from the first terminal an and the third terminal c. The third terminal c of the third splitter 603 is connected to the input terminal of the third power detector 608.

The third splitter 603 has a circuit configuration formed of resistors R607 to R609. In this third splitter 603, the resistor R607 is connected between the first terminal an and the second terminal b, the resistor R609 is connected between the first terminal an and the third terminal c, and the resistor R608 is connected between the second terminal b and the third terminal c.

The first phase shifter 604 has a first terminal an and a second terminal b, wherein the first terminal an is connected to the second terminal b of the first splitter 601, and the second terminal b is connected to the first terminal an of the second splitter 602, whereby a signal applied to the first terminal is shifted in phase and output from the second terminal b, and a signal applied to the second terminal b is shifted in phase and output from the first terminal a.

The first phase shifter 604 is formed in a π-type LC phase shifter configuration consisting of an inductor L601 and a capacitors C601 and C602. In this first phase shifter 604, the inductor L601 is connected between the first terminal an and the second terminal b, the capacitor C601 is connected between the first terminal an and the ground potential GND, and the capacitor C602 is connected between the second terminal b and the ground potential GND.

The second phase shifter 605 has a first terminal an and a second terminal b, wherein the first terminal an is connected to the second terminal b of the second splitter 602, and the second terminal b is connected to the second terminal b of the third splitter 603, whereby a signal applied to the first terminal is shifted in phase and output from the second terminal b, and a signal applied to the second terminal b is shifted in phase and output from the first terminal a.

The second phase shifter 605 is formed in a π-type LC phase shifter configuration consisting of an inductor L602 and a capacitors C603 and C604. In this second phase shifter 605, the inductor L602 is connected between the first terminal an and the second terminal b, the capacitor C603 is connected between the first terminal an and the ground potential GND, and the capacitor C604 is connected between the second terminal b and the ground potential GND.

Herein, the term "5-port" is used because there are a total of five ports including two ports of the first and second input terminals TIN21 and TIN22 for inputting the received signal and the local signal, respectively, and further three ports of the output terminals, that is, the output terminal (third terminal c), connected to the first power detector 606, of the first splitter 601, the output terminal (third terminal c), connected to the second power detector 607, of the second splitter 602, and the output terminal (third terminal c), connected to the third power detector 608, of the third splitter 603.

In this 5-port junction circuit configured in the above-described manner, the received signal RS(t) is input to the first signal input terminal TIN21, wherein RS(t) denotes a voltage at the input terminal TIN21 at a time t. The received signal RS(t) is applied to the first terminal an of the first splitter 601 and split into two signals. One of the split two signals is supplied to the first power detector 606 from the third terminal c. The other one of the split two signals is output from the second terminal b of the first splitter 601 to the first terminal an of the first phase shifter 604. The first phase shifter 604 shifts the phase of the applied signal by θ and outputs the resultant signal from its second terminal b to the first terminal an of the second splitter 602.

The second splitter 602 splits the applied signal into two signals. One of the split two signals is supplied to the second power detector 607 from the third terminal c. The other one of the split two signals is output from the second terminal b of the second splitter 602 to the first terminal an of the second phase shifter 605. The second phase shifter 605 shifts the phase of the applied signal by θ and outputs the resultant signal from its second terminal b to the second terminal b of the third splitter 603. The third splitter 603 splits the applied signal into two signals, one of which is supplied to the third power detector 608 and the other is supplied to the second signal input terminal TIN22.

On the other hand, the local signal LS(t) is input to the second signal input terminal TIN22, wherein LS(t) denotes a voltage at the input terminal TIN22 at a time t. The local signal LS(t) is applied to the first terminal an of the third splitter 603 and split into two signals, one of which is supplied to the third power detector 608, and the other is supplied to the second terminal b of the phase shifter 605. The second phase shifter 605 shifts the phase of the applied signal by θ and outputs the resultant signal from its first terminal a to the second terminal b of the second splitter 602.

The second splitter 602 splits the applied signal into two signals, one of which is supplied to the second power detector 607, and the other is supplied to the first phase shifter 604. The first phase shifter 604 shifts the phase of the applied signal by θ and outputs the resultant signal from its first terminal a to the second terminal b of the first splitter 601. The signal applied to the first splitter 601 is split into two signals, one of which is supplied to the first power detector 606, the other is supplied to the first signal input terminal TIN21.

Thus, the input terminal of the first power detector 606 is supplied with the vector sum of the received signal RS(t) and the local signal LS(t) shifted in phase by $\theta_1+\theta_2$. The first power detector 606 detects the amplitude component of the supplied signal and outputs the result as a detected signal P1.

Similarly, the input terminal of the second power detector 607 is supplied with the vector sum of the received signal RS(t) and the local signal LS(t) shifted in phase by θ. The second power detector 607 detects the amplitude component of the supplied signal and outputs the result as a detected signal P2.

The input terminal of the first power detector 608 is supplied with the vector sum of the received signal RS(t) shifted in phase by $\theta_1+\theta_2$ and the local signal LS(t). The third power detector 608 detects the amplitude component of the supplied signal and outputs the result as a detected signal P3.

This 5-port junction circuit, having the splitter 601 employed instead of the coupler, has advantages not only in terms of the wide bandwidth and the low local signal power but also in terms of the low distortion and the low power dissipation. The 5-port junction circuit has a further advantage in that a receiver can be realized whose characteristics do not change for a long time without being influenced by a temperature variation. Another advantage is that the 5-port junction circuit can be formed in a simple circuit configuration including a small number of circuit elements.

Figure 8:
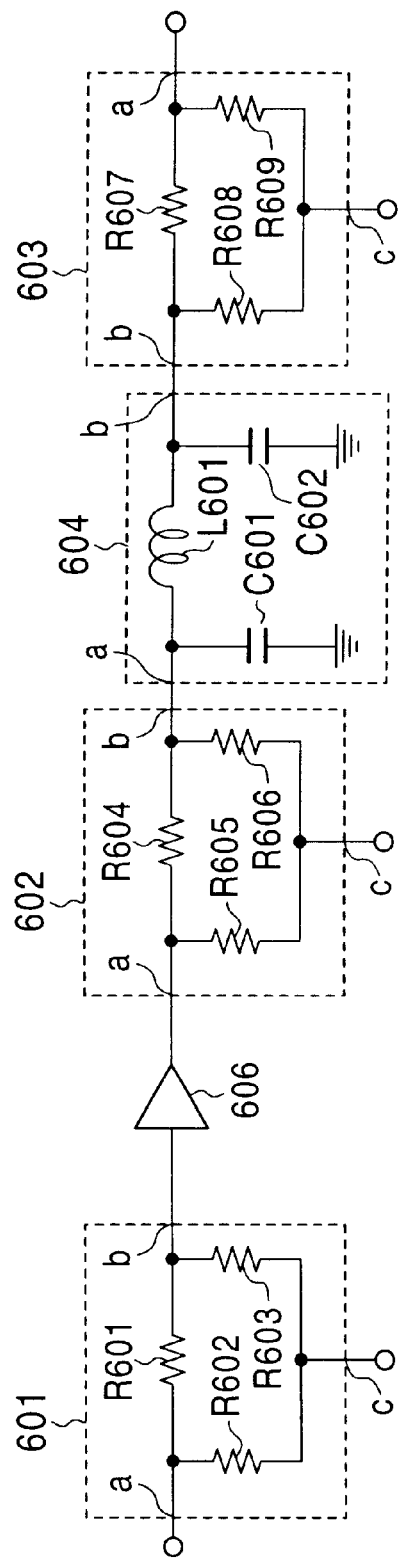
FIG. 8 is a circuit diagram illustrating still another example of the circuit configuration of a 5-port junction circuit according to the present invention.

FIG. 8 illustrates another example of the circuit configuration of the 5-port junction circuit.

This 5-port junction circuit 2021B differs from that shown in FIG. 7 in that the phase shifter 604 in the circuit shown in FIG. 7 is replaced with an active isolator 606 which transfers a signal only in a forward direction from the first splitter 601 to the second splitter 602.

Except for the isolation between the first splitter 601 and the second splitter 602, the 5-port junction circuit shown in FIG. 8 is similar to that shown in FIG. 7, and thus similar parts are not described herein in further detail.

In the first IQ signal demodulation process during which the first terminal an and the third terminal c of the switching circuit are connected to each other, the multiport IQ signal converter 2025 converts the digital detected signals output from the power detectors in accordance with predetermined circuit parameters including circuit parameters of the multiport junction circuits 2021-1 and 2021-2, so as to obtain a plurality of signal components contained in the original received signal or local signal, that is, the multiport IQ signal converter 2025 demodulates the digital detected signals output from the power detectors into an in-phase signal (I) and a quadrature signal (Q).

The detected signals $P_1$ to $P_k$ output from the power detectors 2023-1 to 2023-k are converted by the multiport IQ signal converter 2025 into demodulated signals, that is, the in-phase signal I(t) and the quadrature signal Q(t) in accordance with the following equation (2).

$$I(t)=f_I(P_1, P_2, \ldots, P_N)$$

$$Q(t)=f_q(P_1, P_2, \ldots, P_N) \qquad (2)$$

When the second terminal b and the third terminal c of the switching circuit are connected to each other, the multiport IQ signal converter 2025 determines the amplitude of the receive signal and also determines the phase shift of the phase shifter as described below.

The local signal generator 203 generates the local signal LS with the predetermined frequency and supplies it to the first terminal an of the switching circuit 205.

When the local signal generator 203 generates the local signal LS, the local signal generator 203 controls the signal level (amplitude) in accordance with an output signal S2025a output from the multiport IQ signal converter 2025 and controls the frequency thereof in accordance with a regenerated signal S204 output from the carrier regenerator 204.

The carrier regenerator 204 regenerates a carrier signal S204 in accordance with the demodulated signal output from the multiport IQ signal converter 2025 and supplies the resultant regenerated signal S204 to the local signal generator 203.

In response to receiving a signal S2025b from the multiport IQ signal converter 2025, the controller supplies a control signal CTL1 to the RF amplifiers 2013-1 and 2013-2 to control the amplification factors (gains) thereof.

Similarly, in response to receiving a signal S2025b from the multiport IQ signal converter 2025, the controller supplies a control signal CTL2 to phase shifter 2014-1 to control the amount of phase shift created thereby.

The details of the operations performed by the multiport IQ signal converter 2025 to determine the amplitude of the received signal and to determine the phase shift created by the phase shifter, and the IQ signal demodulation process are described below.

In the following explanation, for the purpose of simplicity, it is assumed that the multiport junction circuit is of the 5-port type.

When the amplitude of the received signal and the phase shift of the phase shifter are determined, as described above, the third terminal c and the second terminal b of the switching circuit 205 are connected to each other, and the second terminal TIN22 of the multiport junction circuit 2021-1 is grounded.

At a time t, a received signal $S_{ri}(t)$ represented in an equation shown below is applied to the multiport junction circuits 2021-1 and 2021-2 connected to the respective antenna elements 2011-1 and 2011-2. Herein, $S_{ri}(t)$ is a modulation signal whose phase and amplitude are modulated according to information. Because the frequency is the rate of change in phase, $S_{ri}(t)$ may be a frequency modulation signal.

$$S_{ri}(t)=A_{ri}d \exp(j(\omega_c t+\Phi_{ri}))=A_{ri}(d \cos \Phi_{ri}+jd \sin \Phi_{ri})\exp(j\omega_c t)= A_{ri}(I_{ri}+jQ_{ri})\exp(j\omega_c t) \qquad (3)$$

where $A_{ri}$ denotes the mean voltage amplitude of a signal received by a ith antenna element, $d_I$ denotes the amplitude of the signal received by the ith antenna element, $\Phi_{ri}$ denotes the phase of the signal received by the ith antenna element, and $\omega_c$ denotes the angular frequency of the carrier. Furthermore, the following equations hold.

$$I_{ri} = d \cos \Phi_{ri} \quad (4)$$

$$Q_{ri} = d \sin \Phi_{ri} \quad (5)$$

$$|\Phi| = |\Phi_{r1} - \Phi_{r2}| \quad (6)$$

The voltages $v_0$, $v_1$, $v_2$, and $v_1$ input to the power detectors 2023-1, 2023-2, 2023-3, and 2023-4, respectively are represented as follows:

$$v_0 = k_{111} S_{r1}(t) \quad (7)$$

$$v_1 = k_{112} S_{r2}(t) \quad (8)$$

$$v_2 = k_{211} S_{r1}(t) \exp(-j\theta_{11}) + k_{112} S_{r2}(t) \exp(-j\theta_{12}) \quad (9)$$

$$v_3 = k_{311} S_{r1}(t) \exp(-j(\theta_{11}+\theta_{11})) + k_{312} S_{r2}(t) \exp(-j(\theta_{12}+\theta_{22})) \quad (10)$$

In the above equations, $k_{nmi}$ denotes a voltage transfer factor from a terminal m to a terminal n of the 5-port junction circuit connected to an antenna element i1, and $\theta_{ji}$ denotes the phase shift of a jth phase shifter in the 5-port junction circuit connected to the antenna element i1.

The voltage of a baseband output signal of a power detector is given by the following equation:

$$P_N = C_N |v_N|^2 \quad (11)$$

where $C_N$ denotes a factor associated with a power detector. Thus, the voltages of the baseband output signals of the respective power detectors 2023-1, 2023-2, 2023-3, and 2023-4 are given by the following equations:

$$P_0 = C_0 |k_{111} S_{r1}(t)|^2 \quad (12)$$

$$P_1 = C_1 |k_{112} S_{r2}(t)|^2 \quad (13)$$

$$P_2 = C_2 |k_{211} S_{r1}(t) \exp(-j\theta_{11}) + k_{212} S_{r2}(t) \exp(-j\theta_{12})|^2 \quad (14)$$

$$P_3 = C_3 |k_{311} S_{r1}(t) \exp(-j(\theta_{11}+\theta_{21})) + k_{312} S_{r2}(t) \exp(-j(\theta_{12}+\theta_{22}))|^2 \quad (15)$$

In the present embodiment, it is assumed that the 5-port junction circuits 2021-1 and 2021-2 have the same characteristic and have a symmetric structure such that the structure becomes similar for each of the two input terminals. From the above assumption, the following relationships hold: $k_{11i} = k_{32i} = k_{11}$; $k_{21i} = k_{22i} = k_{21}$; $k_{31i} = k_{12i} = k_{12}$; and $\theta_{i1i} = \theta_{2i} = \theta$. The three power detectors are equal in configuration, and hence $C = C_1 = C_2 = C_3$.

Of the outputs of the A/D converters 2024-1 to 2024-K, the output $P_0$ of the A/D converter 2024-1 represents the output power of the signal received by the first antenna element 2011-1, and the output $P_1$ of the A/D converter 2024-2 represents that received by the antenna element 2011-2.

In response to receiving a signal S2025b, the controller 206 outputs the control signal CTL1 to the RF amplifiers 2013 and 2013-2 thereby controlling the amplification factors of the RF amplifiers 2013-1 and 2013-2 such that the following equation holds.

$$P_0 = P_1 \quad (16)$$

When two multiport junction circuits 2021-1 and 2021-2 are the same in structure and characteristics, the following equation holds.

$$\left(\frac{k_{11}}{k_{21}}\right)\sqrt{P_2} = \left(\frac{k_{11}}{k_{31}}\right)\sqrt{P_3} = \ldots = \left(\frac{k_{11}}{k_{N1}}\right)\sqrt{P_N} \quad (17)$$

$$= |\sqrt{P_0} + \sqrt{P_1} \exp(j\phi)|$$

$$= |\sqrt{P_0} + \sqrt{P_1} \exp(-j\phi)|$$

where $k_{nmi}$ denotes a voltage transfer factor from a terminal m to a terminal n of the multiport junction circuit, and $|\Phi|$ denotes the phase difference between the signals received by the 2-element antenna at the inputs of the signal combiner. From equations (17), $\Phi$ can be represented using $P_0$, $P_1$, and $P_2$ as follows:

$$\phi = \cos^{-1}\left(\frac{(k_{11})^2 P_2 - (k_{21})^2 (P_0 + P_1)}{2(k_{21})^2 \sqrt{P_0 P_1}}\right) \quad (18)$$

$|\Phi|$ can be calculated from the above equation. In response to receiving the signal S2025b, the controller 206 outputs the control signal CTL2 to the phase shifter 2014-1 to controls the phase shift of the phase shifter 2014-1 so as to the cancel the above phase difference and such that the following equation holds.

$$\left(\frac{k_{11}}{k_{21}}\right)^2 P_2 = 4P_0 = 4P_1 \quad (19)$$

$|\Phi|$ can be calculated more accurately by taking into account a change in loss caused by a change in the phase shift of the phase shifter. That is, because $P_1$ is a function of $\Phi$, a term $\alpha(\Phi)$ for correcting the change due to the phase shift is employed as shown in the following equation.

$$\left(\frac{k_{11}}{k_{21}}\right)^2 P_2 = P_0 + \alpha(\phi) P_1(\phi) + 2\sqrt{\alpha(\phi) P_0 P_1(\phi)} \cos\phi \quad (20)$$

The operation of the multiport IQ signal converter 2025 during the demodulation of the received signal is described below.

In the demodulation process, the third terminal c and the first terminal an of the switching circuit 205 are connected to each other so that the local signal LS generated by the local signal generator 203 is supplied to the second terminal TIN22 of the multiport junction circuit 2021-1.

The terminal voltage $S_1(t)$ at a time t is given by the following equation:

$$S_1(t) = A_1 \exp(j\omega_c t) \quad (21)$$

The input voltages $v_0$, $v_1$, $v_2$ and $v_3$ of the respective power detectors 2023-1, 2023-2, 2023-3 and 2023-4 are given by the following equations:

$$v_0 = k_{11} S_{r1}(t) + k_{12} S_1(t) \exp(-j(2\theta)) \quad (22)$$

$$v_1 = k_{11} S_{r2}(t) \quad (23)$$

$$v_2 = k_{21} S_{r1}(t) \exp(-j\theta) + k_{22} S_1(t) \exp(-j\theta) + k_{21} S_{r2}(t) \exp(-j\theta) \quad (24)$$

$$v_3 = k_{31} S_{r1}(t) \exp(-j(\theta+\theta)) + k_{32} S_1(t) + k_{31} S_{r2}(t) \exp(-j(\theta+\theta)) \quad (25)$$

Thus, the voltages of the baseband output signals of the respective power detectors 2023-1, 2023-2, 2023-3 and 2023-4 are represented by the following equations:

$$P_0 = C|k_{11}S_{r1}(t) + k_{12}S_1(t)\exp(-j(2\theta))|^2 \quad (26)$$

$$P_1 = C|k_{11}S_{r2}(t)|^2 \quad (27)$$

$$P_2 = C|k_{21}S_{r1}(t)\exp(-j\theta) + k_{22}S_1(t)\exp(-j\theta) + k_{21}S_{r2}(t)\exp(-j\theta)|^2 \quad (28)$$

$$P_3 = C|k_{31}S_{r1}(t)\exp(-j(2\theta)) + k_{32}S_1(t) + k_{31}S_{r2}(t)\exp(-j(2\theta))|^2 \quad (29)$$

If the controlled average power is denoted by $A_{r1} = A_{r2} = A_1$, then equations (17), (18), (19), and (20) can be rewritten as follows:

$$\frac{P_0}{C} = k_{11}^2 A_1^2 d^2 + k_{12}^2 A_1^2 + 2k_{11}k_{12}A_1^2 d\cos(\varphi_{r1} + 2\theta) \quad (30)$$

$$\frac{P_1}{C} = k_{11}^2 A_1^2 d^2 \quad (31)$$

$$\frac{P_2}{C} = 4k_{21}^2 A_1^2 d^2 + k_{12}^2 A_1^2 + 4k_{11}k_{12}A_1^2 d\cos(\Phi_{r1}) \quad (32)$$

$$P_3/C = 4k_{21}^2 A_1^2 d^2 + k_{12}^2 A_1^2 + 4k_{11}k_{12}A_1^2 d\cos(\Phi_{r1} - 2\theta) \quad (33)$$

The baseband output signals $P_1$, $P_2$, and $P_3$ represented by equations (30), (31), (32), and (33) are converted by the multiport IQ signal converter 2025 by means of functions represented by equations (34) and (35) into an in-phase signal I(t) and a quadrature signal Q(t) and thus demodulated signals are obtained.

$$I(t) = h_{i0} + 2h_{i1}(P_0 + P_1) + h_{i2}P_2 + h_{i3}P_3 \quad (34)$$

$$Q(t) = h_{q0} + 2h_{q1}(P_0 + p_1) + h_{q2}P_2 + h_{q3}P_3 \quad (35)$$

In the above equations, $h_{i0}$, $h_{i1}$, $_{i2}$, $h_{q0}$, $h_{q1}$, $h_{q2}$, $h_{q3}$, and $k_{ij}$ satisfy the following conditions:

$$h_{i0} = 0 \quad (36)$$

$$h_{i1} = h_{i3} = \frac{1}{-2(\kappa_{11} - \kappa_{12})^2 \cos(2\theta) A_1^2} \quad (37)$$

$$h_{i2} = -h_{i1}\frac{\kappa_{11}^2 + \kappa_{12}^2}{\kappa_{21}^2} \quad (38)$$

$$h_{q0} = -\frac{1}{2\sin(2\theta)A_1^2}\frac{\kappa_{11}^2 - \kappa_{12}^2}{\kappa_{11}\kappa_{12}(2\kappa_{11}\kappa_{12}\cos(2\theta) - \kappa_{11}^2 - \kappa_{12}^2)} \quad (39)$$

$$h_{q1} = \frac{1}{2\sin(2\theta)A_1^2}\frac{\kappa_{12}^2 - \kappa_{11}\kappa_{12}\cos(2\theta)}{\kappa_{11}\kappa_{12}(2\kappa_{11}\kappa_{12}\cos(2\theta) - \kappa_{11}^2 - \kappa_{12}^2)} \quad (40)$$

$$h_{q2} = -\frac{1}{2\sin(2\theta)A_1^2}\frac{(\kappa_{11}^2 - \kappa_{12}^2)\cos(2\theta)}{\kappa_{21}^2(2\kappa_{11}\kappa_{12}\cos(2\theta) - \kappa_{11}^2 - \kappa_{12}^2)} \quad (41)$$

$$h_{q3} = \frac{1}{2\sin(2\theta)A_1^2}\frac{\kappa_{11}\kappa_{12}\cos(2\theta) - \kappa_{11}^2}{\kappa_{11}\kappa_{12}(2\kappa_{11}\kappa_{12}\cos(2\theta) - \kappa_{11}^2 - \kappa_{12}^2)} \quad (42)$$

$$\kappa_{ij} = C\sqrt{k_{ij}} \quad (43)$$

As described above, using the circuit according to the present invention, the demodulated signals I and Q can be obtained from the received signal.

The receiver according to the second embodiment includes, as described above, the phased array antenna 201, the multiport direct conversion modulator 202, and the switching circuit 205. In the phased array antenna 201, the preselect filter 2012-1, the RF amplifier 2013-1, and the phase shifter 2014-1 for shifting the phase of the received signal by a predetermined amount so that the phased array antenna has directivity are connected in cascade to the antenna element 2011-2, and the preselect filter 2012-2 and the RF amplifier 2013-2 are connected in cascade to the antenna element 2022-2. The multiport direct conversion demodulator includes the multiport junction circuit 2021-1 which is supplied with the local signal LS and the first received signal RS1 output from the phase shifter 2014-1 of the array antenna 201 or supplied with only the first received signal RS1 and which generates two or more signals (high-frequency signals) having a phase difference on the basis of at least one of the supplied signals and outputs the first received signal RS1, the local signal LS, and at least one of the generated signals; the multiport junction circuit 2021-2 which is supplied with the second received signal RS2 output from the RF amplifier 2013-2 of the array antenna 201 and which generates two or more signals having a phase difference and outputs the generated signals; signal combiners 2022-1 to 2022-L for combining the signals output from the output terminals of the multiport junction circuits 2021-1 and 2021-2 and supplying the combined signals to the power detectors 2023-3 to 2023-K corresponding to the output terminals of the multiport junction circuits 2021-1 and 2021-2; the power detectors 2023-1 to 2023-K for detecting the amplitude components of the signals output from the signal combiners 2022-1 to 2022-L and outputting the resultant signals as P0 to Pk; the A/D converters 2024-1 to 2024-K for converting the detected signals P0 to Pk output from the power detectors 2023-1 to 2023-K from analog form into digital form; the multiport IQ signal converter 2025 for converting the digital signals detected by the power detectors in accordance with predetermined circuit parameters including circuit parameters of the multiport junction circuits 2021-1 and 2021-2, so as to obtain a plurality of signal components contained in the original received signal or local signal, that is, for demodulating the digital signals detected by the power detectors into an in-phase signal (I) and a quadrature signal (Q) and also for determining the amplitudes of the received signals and the phase shift created by the phase shifter; and the switching circuit 205 for supplying the local signal LS to the second input terminal TIN22 of the multiport junction circuit 2021-1 during the IQ signal demodulation process and for grounding the second input terminal TIN22 of the multiport junction circuit 2021-1 during the process of determining the amplitudes of the received signals and the phase shift of the phase shifter.

Thus, the receiver constructed in the above-described manner according to the second embodiment of the present invention has the advantage that information about the amplitudes of the signals received by the antenna elements is not lost and the directivity of the phased array antenna can be arbitrarily controlled.

Furthermore, use of the multiport demodulator including the power detectors makes it possible to expand the bandwidth of the receiver. This is useful in particular when a software radio communication technique is employed because this technique needs a multiband capability or a wide-band characteristic. In advanced radio communication techniques, there is a tendency to use a carrier at a higher frequency. The multiport demodulator can adapt to such a higher-frequency operation.

In the multiport demodulator, because the power detectors operate in linear regions, low-distortion demodulation can be achieved using a low-power local signal.

Because the amount of phase shift and the amplitude amplification factors necessary to control the directivity of the phased array antenna are calculated directly from the received signal, it is not required to perform calibration for each antenna element, and thus it is possible to reduce the cost of the receiver. Furthermore, it is possible to minimize the change in characteristic of the receiver due to changes in characteristics of the antenna elements caused by a temperature change or an aging effect.

As described above, the present invention provides the great advantage that information of the amplitudes of the signals received by the antenna elements is not lost and the directivity of the phased array antenna can be arbitrarily controlled.

Furthermore, use of the multiport demodulator including the power detectors makes it possible to expand the bandwidth of the receiver. This is useful in particular when a software radio communication technique is employed because this technique needs a multiband capability or a wide-band characteristic. In advanced radio communication techniques, there is a tendency to use a carrier at a higher frequency. The multiport demodulator can adapt to such a higher-frequency operation.

In the multiport demodulator, because the power detectors operate in linear regions, low-distortion demodulation can be achieved using a low-power local signal.

Because the amount of phase shift and the amplitude amplification factors necessary to control the directivity of the phased array antenna are calculated directly from the received signal, it is not required to perform calibration for each antenna element, and thus it is possible to reduce the cost of the receiver. Furthermore, it is possible to minimize the change in characteristic of the receiver due to changes in characteristics of the antenna elements caused by a temperature change or an aging effect.

What is claimed is:

1. A receiver comprising:
    a phased array antenna comprising first and second antenna elements for receiving a radio signal; and a phase shifter for shifting, by a predetermined amount, the phase of a signal received by the first antenna element;
    a local signal generator for generating a local signal with a predetermined frequency; and
    a direct conversion demodulator comprising:
        first generating means which is supplied with the received signal output from the phase shifter of the phased array antenna and the local signal generated by the local signal generator and which generates two signals different in phase on the basis of at least one of the supplied signals and outputs at least one of the generated signals;
        second generating means which is supplied with the received signal output from the second antenna element of the phased array antenna and the local signal generated by the local signal generator and which generates two signals different in phase on the basis of at least one of the supplied signals and outputs at least one of the generated signals;
        at least one signal combiner for combining corresponding signals output from the first generating means and the second generating means;
        at least one power detector for detecting the signal level of a signal output from the signal combiner; and
        a converter for converting the signal output from the power detector on the basis of a predetermined parameter so as to obtain a plurality of signal components contained in the received signal or the local signal.

2. A receiver according to claim 1, wherein each of the first and second generating means includes a plurality of signal output terminals, and signals output from the first and second generating means are applied to the signal combiners such that the signals output from the output terminals which are similar in structure are applied to the same one of the signal combiners.

3. A receiver according to claim 1, wherein the phased array antenna comprises first and second amplifiers for amplifying the signals received by the first and second antenna elements by predetermined amplification factors.

4. A receiver according to claim 1, wherein the local signal generator sets the level of the local signal in accordance with the output signal of the converter.

5. A receiver according to claim 1, further comprising a regenerator for regenerating a carrier signal in accordance with the conversion signal output from the converter such that the carrier signal has the same frequency as that output from the local signal generator.

6. A receiver comprising:
    a phased array antenna comprising first and second antenna elements for receiving a radio signal; first and second amplifiers for amplifying signals received by the first and second antenna elements, respectively, by predetermined amplification factors; and a phase shifter for shifting, by a predetermined amount, the phase of the signal received by the first antenna element;
    a local signal generator for generating a local signal with a predetermined frequency;
    a direct conversion demodulator comprising:
        first generating means which is supplied with the received signal shifted in phase by the phase shifter of the phased array antenna and the local signal generated by the local signal generator during a signal demodulation process and which is supplied, at a predetermined time not during the signal demodulation process, with the received signal shifted in phase by the phase shifter of the phased array antenna, thereby generating a plurality of signals which are different in phase;
        second generating means which is supplied with the received signal output from the second amplifier of the phased array antenna and which generates a plurality of signals different in phase;
        a first power detector for detecting the level of a signal output from the first generating means;
        a second power detector for detecting the level of a signal output from the second generating means;
        at least one signal combiner for combining corresponding signals output from the first generating means and the second generating means, except for output signals applied to the first and second power detectors;
        at least one third power detector for detecting the signal level of a signal output from the signal combiner; and
        a converter for, during the signal demodulation process, converting the output signals of the first, second, and third power detectors so as to obtain a plurality of signal components contained in the received signal or the local signal in accordance with a predetermined parameter, and, at a predetermined time not during the signal demodulation process, determining the amplification factors of the first and second amplifiers in accordance with the output signals of the first and second power detectors so that a predetermined condition is satisfied.

7. A receiver according to claim 6, wherein the converter determines the amplification factor such that $P_0=P_1$ where $P_0$ is the output signal power of the first power detector and $P_1$ is the output signal power of the second power detector.

8. A receiver according to claim 6, further comprising a controller for controlling the first and second amplifiers such that the first and second amplifiers have amplification factors equal to those determined by the converter.

9. A receiver according to claim 7, further comprising a controller for controlling the first and second amplifiers such that the first and second amplifiers have amplification factors equal to those determined by the converter.

10. A receiver according to claim 6, wherein signals output from the first and second generating means are applied to the signal combiners such that the signals output from the output terminals which are similar in structure are applied to the same one of the signal combiners.

11. A receiver according to claim 6, wherein the local signal generator sets the level of the local signal in accordance with the output signal of the converter.

12. A receiver according to claim 6, further comprising a regenerator for regenerating a carrier signal in accordance with the conversion signal output from the converter such that the carrier signal has the same frequency as that output from the local signal generator.

13. A receiver comprising:
a phased array antenna comprising first and second antenna elements for receiving a radio signal; first and second amplifiers for amplifying signals received by the first and second antenna elements, respectively, by predetermined amplification factors; and a phase shifter for shifting, by a predetermined amount, the phase of the signal received by the first antenna element;
a local signal generator for generating a local signal with a predetermined frequency; and
a direct conversion modulator comprising:
first generating means which is supplied with the received signal shifted in phase by the phase shifter of the phased array antenna and the local signal generated by the local signal generator during a signal demodulation process and which is supplied, at a predetermined time not during the signal demodulation process, with the received signal shifted in phase by the phase shifter of the phased array antenna, thereby generating a plurality of signals which are different in phase;
second generating means which is supplied with the received signal output from the second amplifier of the phased array antenna and which generates a plurality of signals different in phase;
a first power detector for detecting the level of a signal output from the first generating means;
a second power detector for detecting the level of a signal output from the second generating means;
at least one signal combiner for combining corresponding signals output from the first generating means and the second generating means, except for output signals applied to the first and second power detectors;
at least one third power detector for detecting the signal level of a signal output from the signal combiner; and
a converter for, during the signal demodulation process, converting the output signals of the first, second, and third power detectors so as to obtain a plurality of signal components contained in the received signal or the local signal in accordance with a predetermined parameter, and, at a predetermined time not during the signal demodulation process, determining the amount of phase shift created by the phase shifter in accordance with the output signals of the first, second and third power detectors so that a predetermined condition is satisfied.

14. A receiver according to claim 13, wherein, on the basis of the output signal powers $P_0$, $P_1$, and $P_2$ of the first, second and third power detectors, respectively, the converter determines the phase difference at the input terminals of the signal combiner between the signals received by the two antenna elements and determines the amount of phase shift created by the phase shifter so that the phase difference is cancelled.

15. A receiver according to claim 13, further comprising a controller for adjusting the phase shift of the phase shifter in accordance with the amount of phase shift determined by the converter.

16. A receiver according to claim 14, further comprising a controller for adjusting the phase shift of the phase shifter in accordance with the amount of phase shift determined by the converter.

17. A receiver according to claim 13, wherein signals output from the first and second generating means are applied to the signal combiners such that the signals output from the output terminals which are similar in structure are applied to the same one of the signal combiners.

18. A receiver according to claim 13, wherein the local signal generator sets the level of the local signal in accordance with the output signal of the converter.

19. A receiver according to claim 13, further comprising a regenerator for regenerating a carrier signal in accordance with the conversion signal output from the converter such that the carrier signal has the same frequency as that output from the local signal generator.

20. A receiver comprising:
a phased array antenna comprising first and second antenna elements for receiving a radio signal; first and second amplifiers for amplifying signals received by the first and second antenna elements, respectively, by predetermined amplification factors; and a phase shifter for shifting, by a predetermined amount, the phase of the signal received by the first antenna element;
a local signal generator for generating a local signal with a predetermined frequency; and
a direct conversion demodulator comprising:
first generating means which is supplied with the received signal shifted in phase by the phase shifter of the phased array antenna and the local signal generated by the local signal generator during a signal demodulation process and which is supplied, at a predetermined time not during the signal demodulation process, with the received signal shifted in phase by the phase shifter of the phased array antenna, thereby generating a plurality of signals which are different in phase;
second generating means which is supplied with the received signal output from the second amplifier of the phased array antenna and which generates a plurality of signals different in phase;
a first power detector for detecting the level of a signal output from the first generating means;
a second power detector for detecting the level of a signal output from the second generating means;
at least one signal combiner for combining corresponding signals output from the first generating means and the second generating means, except for output signals applied to the first and second power detectors;

at least one third power detector for detecting the signal level of a signal output from the signal combiner; and a converter for, during the signal demodulation process, converting the output signals of the first, second, and third power detectors so as to obtain a plurality of signal components contained in the received signal or the local signal in accordance with a predetermined parameter, and, at a predetermined time not during the signal demodulation process, determining the amplification factors of the first and second amplifiers in accordance with the output signals of the first and second power detectors so that a predetermined condition is satisfied and also determining the amount of phase shift created by the phase shifter in according with the output signals of the first, second and third power detectors so that a predetermined condition is satisfied.

21. A receiver according to claim 20, wherein the converter determines the amplification factors so that the output signal power $P_0$ of the first power detector and the output signal power $P_1$ of the second power detector becomes equal to each other, and furthermore, on the basis of the output signal powers $P_0$, $P_1$, and $P_2$ of the first, second and third power detectors, respectively, the converter determines the phase difference at the input terminals of the signal combiner between the signals received by the two antenna elements and determines the amount of phase shift created by the phase shifter so that the phase difference is cancelled.

22. A receiver according to claim 20, further comprising a controller for controlling the first and second amplifiers so that the first and second amplifiers have the amplification factors determined by the converter, and for controlling the amount of phase shift created by the phase shifter so that the amount of phase shift determined by the converter is created by the phase shifter.

23. A receiver according to claim 21, further comprising a controller for controlling the first and second amplifiers so that the first and second amplifiers have the amplification factors determined by the converter, and for controlling the amount of phase shift created by the phase shifter so that the amount of phase shift determined by the converter is created by the phase shifter.

24. A receiver according to claim 20, wherein signals output from the first and second generating means are applied to the signal combiners such that the signals output from the output terminals which are similar in structure are applied to the same one of the signal combiners.

25. A receiver according to claim 20, wherein the local signal generator sets the level of the local signal in accordance with the output signal of the converter.

26. A receiver according to claim 20, further comprising a regenerator for regenerating a carrier signal in accordance with the conversion signal output from the converter such that the carrier signal has the same frequency as that output from the local signal generator.

* * * * *

UNITED STATES PATENT AND TRADEMARK OFFICE
CERTIFICATE OF CORRECTION

PATENT NO.   : 6,862,442 B2
DATED        : March 1, 2005
INVENTOR(S)  : Sanada et al.

It is certified that error appears in the above-identified patent and that said Letters Patent is hereby corrected as shown below:

<u>Title page,</u>
Insert Item -- [30] Foreign Application Priority Data
                            Oct. 24, 2000    (JP) ................ 2000-324774 --

Signed and Sealed this

Twenty-eighth Day of June, 2005

JON W. DUDAS
*Director of the United States Patent and Trademark Office*